United States Patent
Kerfeld et al.

(10) Patent No.: US 6,821,460 B2
(45) Date of Patent: Nov. 23, 2004

(54) TWO-SIDED REPLICATION OF DATA STORAGE MEDIA

(75) Inventors: Donald J. Kerfeld, St. Paul, MN (US); Barry E. Brovold, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 345 days.

(21) Appl. No.: 09/906,186

(22) Filed: Jul. 16, 2001

(65) Prior Publication Data

US 2003/0011087 A1 Jan. 16, 2003

(51) Int. Cl.[7] ............................................... B29D 11/00
(52) U.S. Cl. ...................... 264/1.33; 264/1.36; 264/1.7
(58) Field of Search ................. 264/1.33, 1.36, 264/1.38, 106, 107, 1.7; 425/810

(56) References Cited

U.S. PATENT DOCUMENTS

| | | | |
|---|---|---|---|
| 4,008,349 A | * | 2/1977 | Ehrenfeld, Jr. et al. |
| 4,185,955 A | | 1/1980 | Holmes et al. |
| 4,374,077 A | | 2/1983 | Kerfeld |
| 4,391,579 A | | 7/1983 | Morrison |
| 4,681,527 A | | 7/1987 | Amory et al. |
| 4,707,321 A | | 11/1987 | Segawa et al. |
| 4,789,320 A | | 12/1988 | Sasamura et al. |
| 5,018,962 A | | 5/1991 | Kitamura et al. |
| 5,078,947 A | * | 1/1992 | Nishizawa et al. |
| 5,202,880 A | | 4/1993 | Lee et al. |
| 5,460,763 A | | 10/1995 | Asai |
| 5,470,627 A | | 11/1995 | Lee et al. |
| 5,607,705 A | | 3/1997 | Asai |
| 5,780,068 A | | 7/1998 | Shinohara |
| 5,804,229 A | | 9/1998 | Asai |
| 5,827,593 A | | 10/1998 | Maruyama et al. |
| 5,893,998 A | | 4/1999 | Kelley et al. |
| 6,210,609 B1 | | 4/2001 | Takeda et al. |

FOREIGN PATENT DOCUMENTS

| | | |
|---|---|---|
| EP | 0018210 A1 | 10/1980 |
| JP | 09-048045 | 2/1997 |
| JP | 9-97453 * | 4/1997 |
| WO | WO 87/02934 | 5/1987 |

* cited by examiner

*Primary Examiner*—Mathieu D. Vargot
(74) *Attorney, Agent, or Firm*—Eric D. Levinson

(57) ABSTRACT

The invention is directed towards techniques for creating optical data storage disks. In one embodiment, the invention provides a simultaneous two-sided rolling bead process. For example, a method may include positioning a first bead of photopolymer for distribution between a bottom stamper and a substrate, and positioning a second bead of photopolymer for distribution between a top stamper and the substrate. The method may also include passing a roller over the top stamper to distribute the beads of photopolymer, curing the photopolymer, and removing the substrate from the stampers. The simultaneous two-sided rolling bead process can be repeated on the same medium to create a two-sided dual-layer data storage medium or a two-sided multi-layer data storage medium.

26 Claims, 10 Drawing Sheets

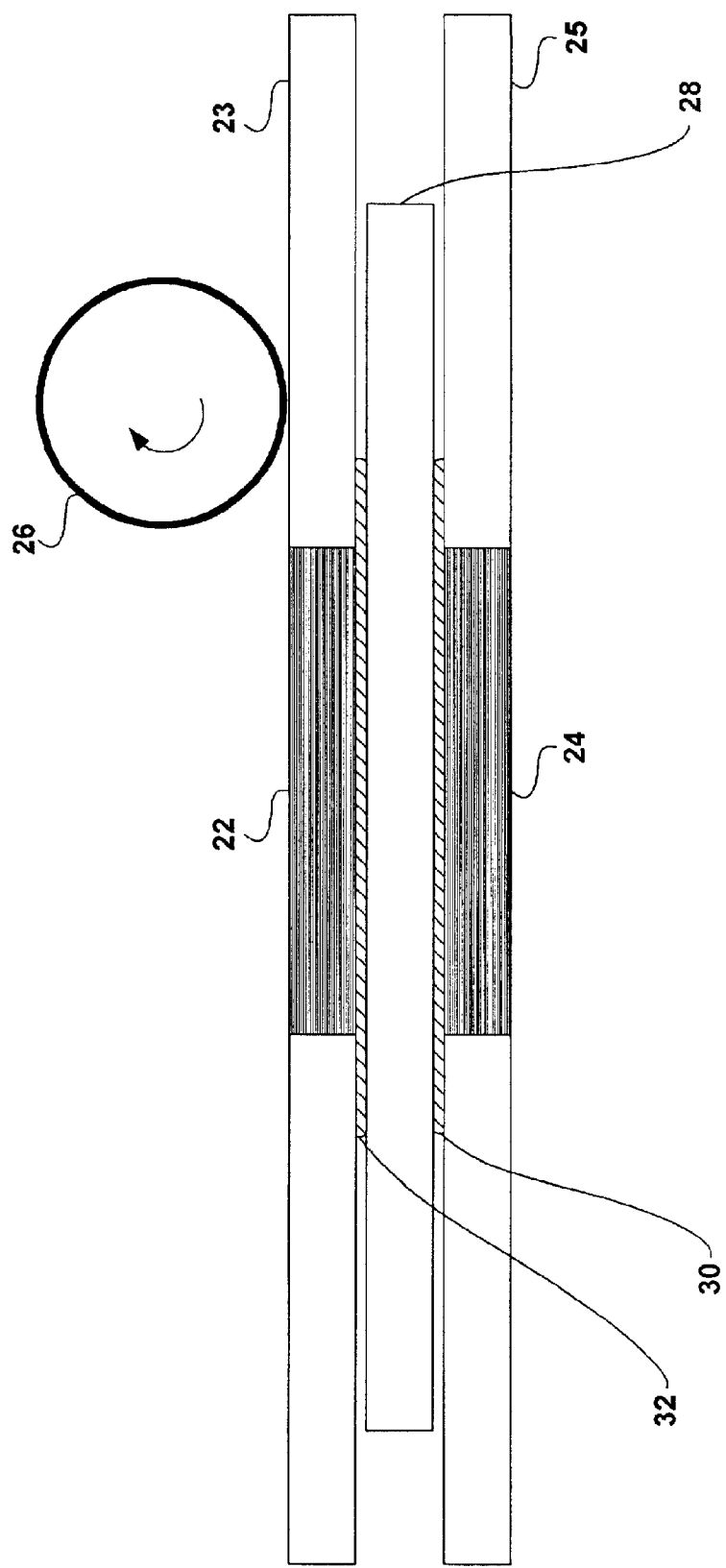

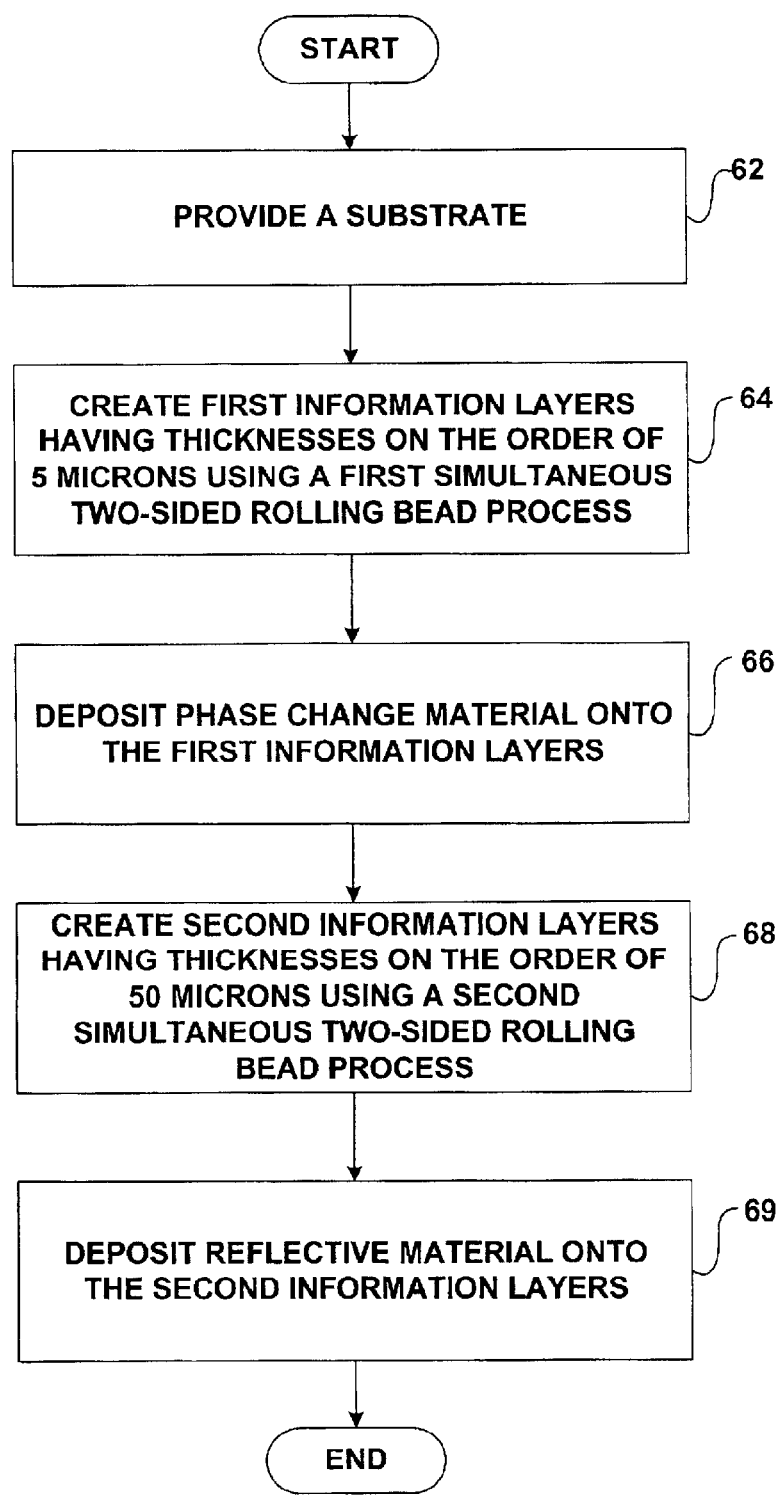

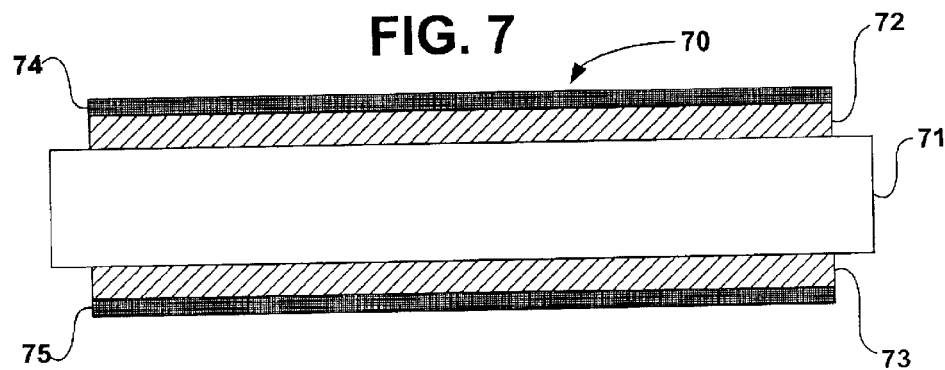
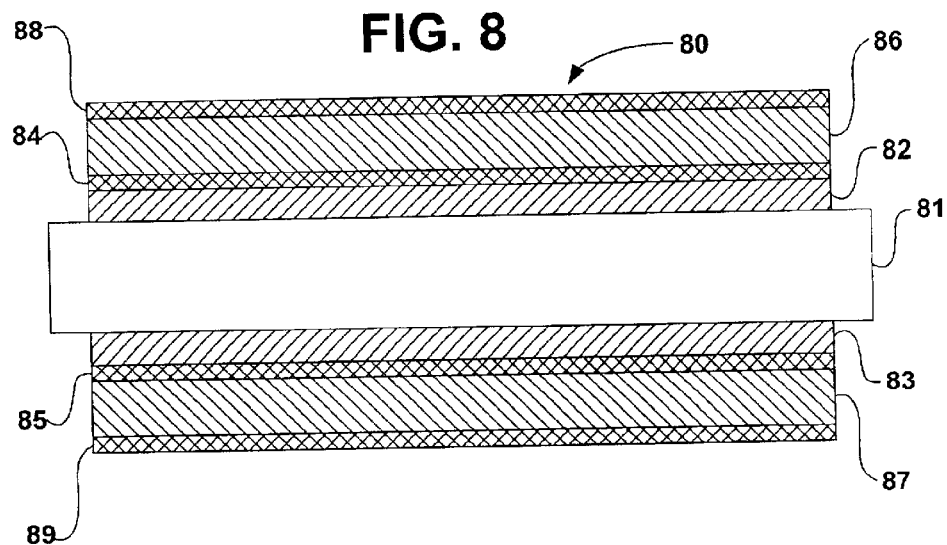
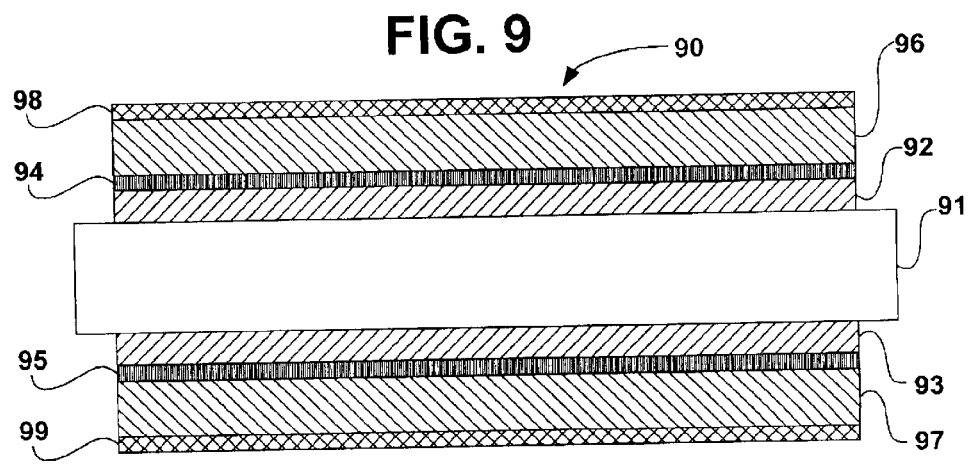

TWO-SIDED REPLICATION OF DATA STORAGE MEDIA

TECHNICAL FIELD

The invention relates to the manufacture of data storage media such as optical data storage disks.

BACKGROUND OF THE INVENTION

Optical media such as optical data storage disks have gained widespread acceptance for the storage, distribution and retrieval of large volumes of information. Optical data storage disks include, for example, audio CD (compact disc), CD-R (CD-recordable), CD-ROM (CD-read only memory), DVD (digital versatile disk or digital video disk) media, DVD-RAM (DVD-random access memory), and various types of rewritable media, such as magneto-optical (MO) disks and phase change optical disks. Some newer formats for optical data storage disks have storage capabilities on both sides of the disk. In addition, some newer formats are progressing toward smaller disk sizes.

Optical data storage disks can be produced by first making a master that has a surface pattern that represents encoded data on the master surface. The surface pattern, for instance, may be a collection of grooves that define master pits and master lands. The master is typically created by a relatively expensive mastering process. After creating a suitable master, that master can then be used to make a stamper. The stamper has a surface pattern that is the inverse of the surface pattern encoded on the master. The stamper, then, can be used to stamp large quantities of replica disks in a mass production stamping process, such as a rolling bead process like that taught by the current inventor in U.S. Pat. No. 4,374,077.

In a rolling bead process, a bead of photopolymer is positioned between a substrate and the stamper. A roller passes over the substrate and the stamper, dispersing the bead of photopolymer and forcing air to the leading edge of the bead. After the roller has passed over the substrate and the stamper and dispersed the photopolymer, the photopolymer can be cured with ultraviolet (UV) light. The stamper is then peeled back, leaving an inverted image of the stamper within the photopolymer that is cured to the substrate. A reflective material, a phase change material, a magneto-optic material, or the like can then be deposited on the photopolymer. Additional protective layers may also be added.

SUMMARY

In general, the invention is directed toward techniques for creating optical data storage disks. In particular, the invention is directed toward techniques for creating two-sided optical data storage disks, or in other words, disks capable of storing information on both sides. In some embodiments, the techniques can be used to create two-sided, dual-layer optical data storage disks. In those cases, two layers of information can be stored on both sides of the disks.

In one embodiment, the invention provides a simultaneous two-sided rolling bead process. For example, a method may include positioning a first bead of photopolymer for distribution between a bottom stamper and a substrate, and positioning a second bead of photopolymer for distribution between a top stamper and the substrate. The method may also include passing a roller over the top stamper to distribute the beads of photopolymer, curing the photopolymer, and removing the substrate from the stampers.

The cured layers of photopolymer on both sides of the substrate define information layers on the medium. Materials can be deposited on the information layers according to a media format. For example, phase change materials, magneto-optic materials or reflective materials can be deposited, depending on the type of medium being created. Reflective materials can be used to define read-only formats, or alternatively phase change materials or magneto-optic materials can be used to define write-once or re-writable formats.

The simultaneous two-sided rolling bead process may be repeated to create additional information layers on both sides of the medium. For example, in one embodiment, a first simultaneous two-sided rolling bead process can be followed by the deposition of phase change material. Then, a second simultaneous two-sided rolling bead process can be applied to the same medium, followed by the deposition of reflective material. The outer reflective layers defined by the reflective material may be semi-transparent so that some light can penetrate through the reflective layers. This can ensure that the phase change materials deposited on the inner information layers can be optically changed and/or optically detected by a disk drive.

In two-sided dual-layer media, the outer information layers may need to be sufficiently thick to avoid optical interference between information stored on the outer layer and information stored on the inner layer on the same side of the medium. In other words, material deposited on the outer information layer may need to be a sufficient distance from material deposited on the inner information layer to ensure that an optical drive is able to focus light on the surface of the inner information layer without interference from outer information layer. The viscosity of the photopolymer that is used to create the information layers can be predetermined to control the thicknesses of the information layers. For example, the photopolymers used in the simultaneous two-sided rolling bead processes can be made to have a sufficiently high viscosity so that information layers have appropriate thicknesses. In particular, outer information layers may need thicknesses on the order of 50 microns or greater.

The invention provides several advantages. For example, the invention can be used to realize optical data storage disks having increased data storage capacities. Moreover, the invention can be used to realize hybrid data storage disks having both read-only format and write-once or re-writable formats on both sides of the disk. Disks having both read-only formats and re-writable formats are particularly useful for applications where some information needs to be permanently stored while other information can be stored and then discarded or replaced.

The techniques according to the invention also provide advantages in optimizing information layer thicknesses. In particular, for two-sided dual-layer disks, the thickness of the outer information layers may need to be sufficiently thick to avoid interference between material deposited on the respective information layers on the same side of the disk. By predetermining the viscosity of the photopolymers used, the invention provides a relatively simple way to control information layer thicknesses. The pressure and rolling speed of the roller used in the simultaneous two-sided rolling bead processes can also be controlled to define information layer thicknesses. Thicknesses on the order of 50 microns for the outer information layers may be sufficient to avoid interference.

Another advantage can be realized by utilizing oversized disks during the two-sided rolling bead processes and then die punching the oversized disks to size. This can avoid problems associated with thickness variations at the outer edges of the oversized disk that may be present if the substrate is an injection molded substrate. The invention also provides advantages over other methods of creating two-sided dual-layer optical data storage disks. In particular, conventional spin coating techniques may be ineffective in creating uniform information layer thicknesses for the outer layers of dual-layer disks. Moreover, because spin coating techniques utilize the effects of gravity in the coating process, spin coating techniques typically require each side of the disk to be spin coated independently. This can lead to disk imperfections and thickness variations of the spin coated photopolymer. The two-sided rolling bead processes according to the invention, however, are not limited in this manner.

Additional details of these and other embodiments are set forth in the accompanying drawings and the description below. Other features, objects and advantages will become apparent from the description and drawings, and from the claims.

BRIEF DESCRIPTION OF THE DRAWINGS

FIGS. 2A–2C are cross-sectional side views of a two-sided rolling bead system.

FIG. 6 is a flow diagram illustrating a process for creating a specific format of a two-sided dual-layer optical data storage medium.

FIGS. 7–11 are cross-sectional side views of exemplary data storage media that can be created using one or more techniques according to the invention.

DETAILED DESCRIPTION

The invention provides techniques for creating optical data storage disks. For example, the invention provides a two-sided rolling bead process for creation of two-sided data storage media. The two-sided rolling bead process can be repeated more than once for the same data storage medium to create a two-sided dual-layer optical data storage medium or a two-sided multi-layer optical data storage medium. Material can be deposited on one or both sides of the data storage medium after each two-sided rolling bead process is performed. In this manner, each layer of the two-sided data storage medium can be defined according to the desired data storage format, e.g., prerecorded, phase change, or magneto-optical.

Figure 1:
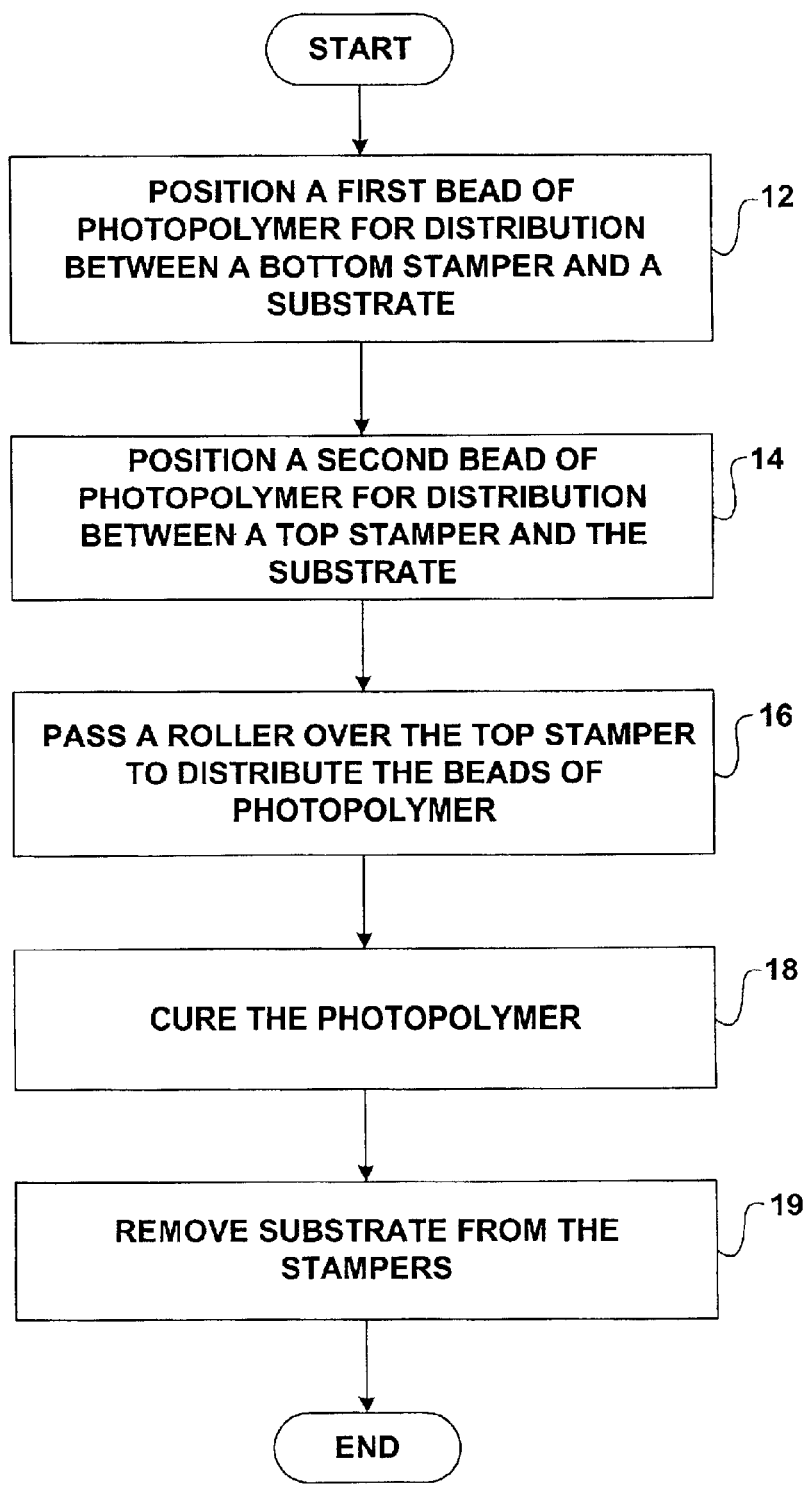
FIG. 1 is a flow diagram according to an embodiment of the invention.

FIG. 1 is a flow diagram according to an embodiment of the invention. As shown, a first bead of photopolymer is positioned for distribution between a bottom stamper and a substrate (12). In addition, a second bead of photopolymer is positioned for distribution between a top stamper and the substrate (14). A roller then passes over the top stamper to distribute the beads of photopolymer evenly across the sides of the substrate (16). The bottom stamper may be supported by a generally fixed support surface. Each stamper may include grooves defining a pattern that represent encoded information. The photopolymer fills into the grooves of the stampers, forming a surface pattern that is the inverse of the patterns defined by the stampers. By passing the roller over the top stamper to distribute the beads of photopolymer, air is removed from the grooves of the stampers and forced to the leading edge of the bead.

Once the roller passes over the top stamper, the beads of photopolymer are evenly dispersed over the top and bottom surfaces of the substrate, filling the grooves or other patterns defined on the surface of the stampers. At this point, the photopolymers can be UV cured (18), bonding the photopolymers to the substrate and preserving the inverse patterns of the stampers in the photopolymers. The substrate can then be peeled away or otherwise removed from the stampers (19). To facilitate peeling, the stampers may be coated with a suitable release agent or the like.

One or both of the stampers can be made semi-transparent so that curing the photopolymers (18) can occur by directing UV light through the semi-transparent stamper. For example, plastic stampers such as polycarbonate stampers, polymethylmethacrylate (PMMA) stampers, or polyester stampers are generally semi-transparent to UV light. If the substrate is also semi-transparent to UV light, only one of the stampers needs to be semi-transparent. In that case, the other stamper may be opaque, possibly reflecting the UV light that passes through the substrate to further cure the photopolymer. In other cases, both stampers are made to be semi-transparent. In those cases, UV light can be directed through both stampers to cure the photopolymers.

By way of example, a suitable photopolymer for use in accordance with the invention may include HDDA (4x6x) polyethylenically unsaturated monomer-hexanediol diacrylate, chemlink 102 (3x) monoethylenically unsaturated monomer-diethylene glycol monoethyl ether acrylate, elvacite 2043 (0.1x3x) organic polymer-polyethylmethacrylate, and irgacure 651 (0.1x.2) latent radical initiator-2,2-dimethoxy-2-phenylacetophenone. Another suitable photopolymer includes HHA (hydantoin hexacryulate) 1x, HDDA (hexanediol diacrylate) 1x, and irgacure 651 (0.1x.2) latent radical initiator-2,2-dimethyoxy-2-phenylacetophenone. These or other photopolymers may be used in accordance with the invention.

More specifically, a photopolymer may include 49% hydantoin hexacrylate, 49% hexanediol diacrylate, and 2% 2-dimethoxy-2-phenylacetophenone. Or alternatively, 40% hexanediol diacrylate, 29% glycol monethyl ether acrylate, 29% polyethyl methacrylate, and 2% 2-dimethoxy-2-phenylacetophenone. As described in greater detail below, the different percentage compositions can be varied to change the viscosity of the photopolymers used. In particular, increased viscosity can yield thicker information layers given the same pressure and speed of the roller used in the two-sided rolling bead process. The preferred photopolymer compositions, however may always include 2% 2-dimethoxy-2-phenylacetophenone.

Figure 2A:
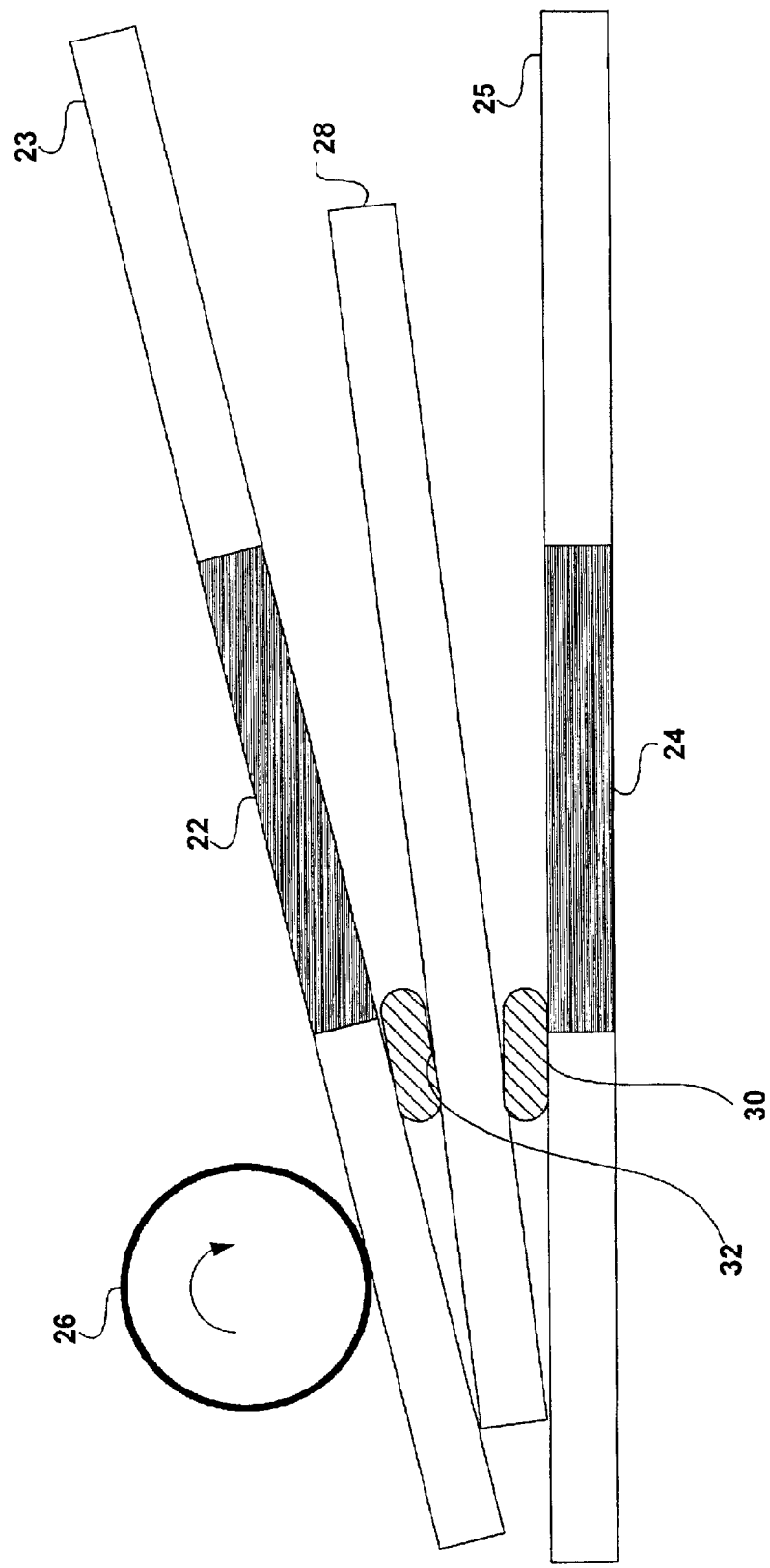
Figure 2B:
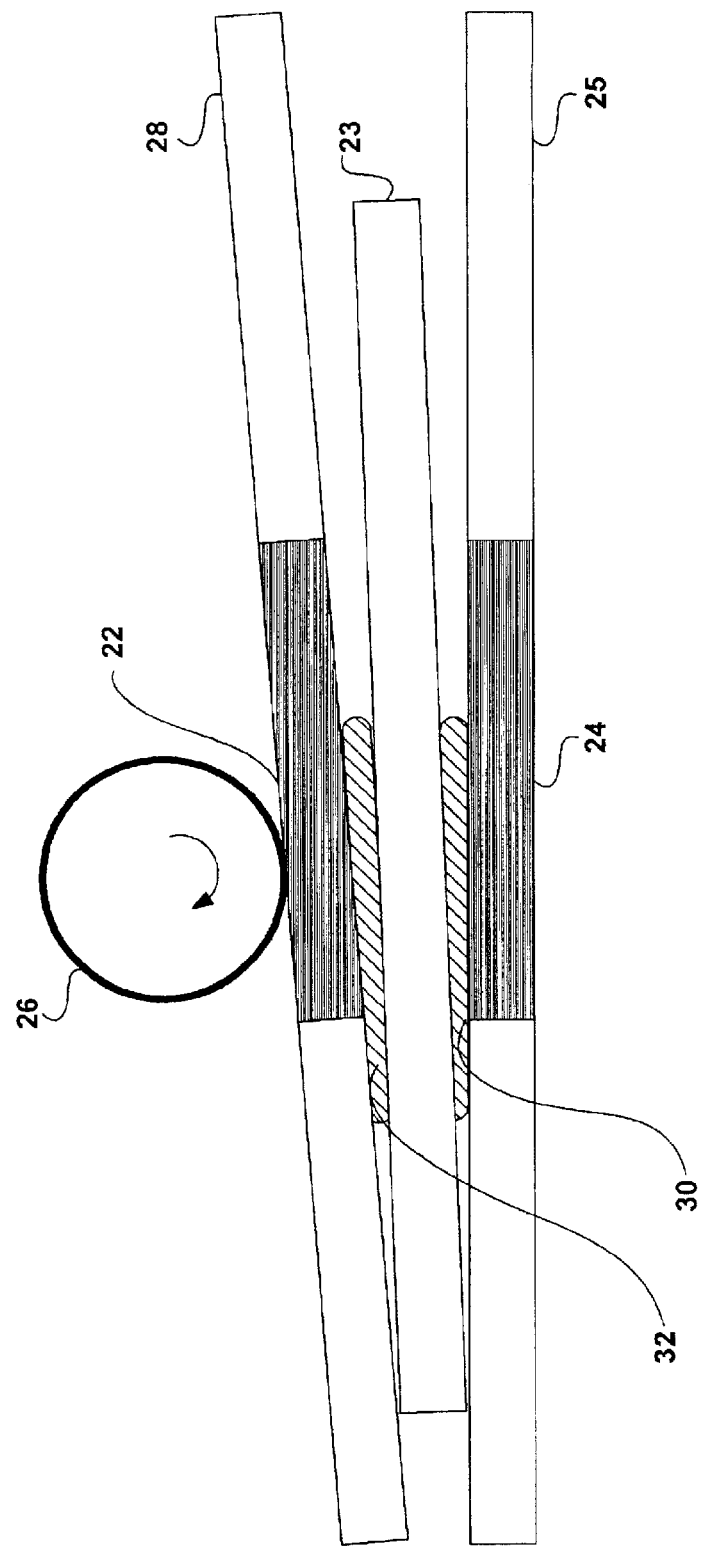

FIGS. 2A–2C are cross-sectional side views of a two-sided rolling bead system. The system may include top stamper 22, bottom stamper 24, and roller 26. The top and bottom stampers may reside in stamper assemblies 23 and 25, although the invention is not limited in that respect. Stampers 22 and 24, for example, can be permanently fixed in stamper assemblies 23 and 25, or alternatively, stampers 22 and 24 may be removable from stamper assemblies 23 and 25. If the stampers are removable, a variety of different stampers may be inserted in the stamper assemblies 23 and 25, depending on the groove pattern to be replicated. Stampers 22 and 24 can be properly aligned relative to one another to ensure that information layers replicated onto top and bottom surfaces of substrate 28 are concentric with one another.

To create an optical data storage medium, substrate 28 is positioned between stampers 22 and 24. A first bead of photopolymer 30 is positioned for distribution between bottom stamper 24 and a bottom surface of substrate 28. Similarly, a second bead of photopolymer 32 is positioned for distribution between top stamper 22 and a bottom surface of substrate 28. The beads of photopolymer 30, 32 can be properly positioned by injection through a nozzle, syringe, pipette, or the like. The beads of photopolymer 30, 32 should be positioned at least a small distance before the regions of substrate 28 that will be encoded with the patterns on stampers 22, 24.

Roller 26 then passes over top stamper 22 to disperse the beads of photopolymers 30, 32 as shown in FIG. 2B. The photopolymer fills the grooves of stampers 22, 24 forming a surface pattern defined by the stampers. Air is removed from the grooves of the stampers and forced to the leading edge of the beads 30, 32.

As roller 26 passes over top stamper 22 as shown in FIGS. 2A–2C, roller 26 spreads the beads of photopolymer 30, 32 such that they are substantially evenly dispersed over the top and bottom surfaces of substrate 28 with a substantially uniform thickness on each respective side. The bottom layer, however, may be slightly thicker than the top layer because substrate 28 disperses the pressure of roller 26 such that the pressure applied to the bottom layer is not as localized as the pressure applied to the top layer. At this point, the photopolymer can be cured to define information layers on both sides of substrate 28. The curing process bonds the photopolymers to substrate 28 and preserves the surface pattern defined by stampers 22 and 24. After curing, stampers 22 and 24 can be peeled apart and substrate 28 can be removed. Material can then be deposited on the information layers according to a desired media format.

Substrate 28 is illustrated as being larger than stampers 22 and 24. This is not necessary, but may provide advantages in media quality. The final data storage medium can be die punched or otherwise removed from the oversized substrate. Die punching substrate 28 to produce a smaller disk can avoid problems associated with thickness variations at the outer edges of substrate 28.

Figure 3:
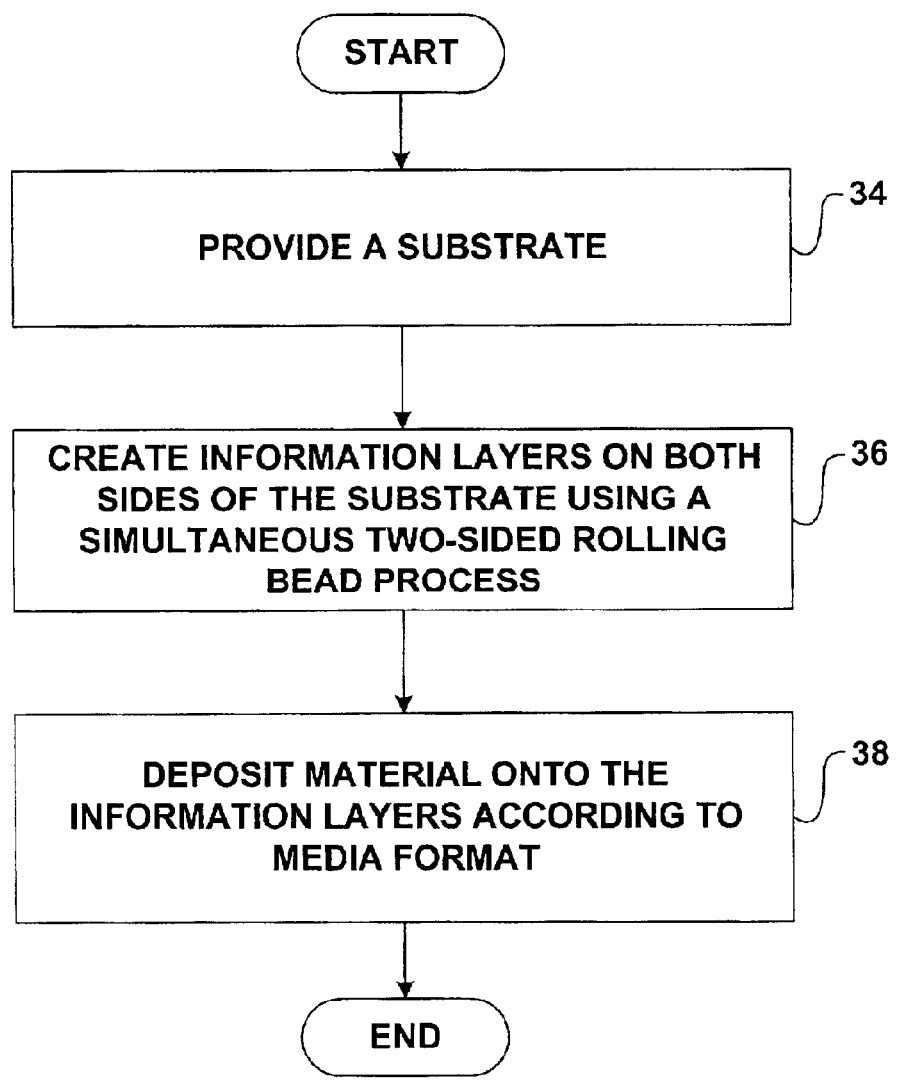
FIG. 3 is another flow diagram according to an embodiment of the invention.

FIG. 3 is another flow diagram according to an embodiment of the invention. As shown, a substrate is provided (34). The substrate generally provides mechanical stability to the medium. For example, the substrate may be comprised of PMMA, polycarbonate or aluminum. Aluminum provides advantages in terms of strength and stability. In addition, aluminum provides advantages in adhesion strength of the bond between the substrate and a photopolymer. Aluminum, however, is opaque. Thus, PMMA and polycarbonate may be more desirable in cases where semi-transparent substrates are necessary, i.e., in the cases where one of the stampers is opaque and UV light is directed thought the substrate to cure the photopolymer on an opposite side of the substrate.

Information layers are then created on both sides of the substrate using a simultaneous two-sided rolling bead process (36). For example, a process similar to that illustrated in FIG. 1 could be used. Material is then deposited onto the information layers according to a desired media format (38). For example, if an information layer is a read-only information layer, a reflective layer can be deposited on the information layer. Nickel or aluminum can be used to realize a suitable reflective layer. The desired thickness of the reflective layer may depend on how reflective the layer needs to be. For example, if multiple information layers are added to a medium, an outer reflective layer may need to be semi-transparent so that some light can penetrate through the reflective layer to detect the inner information layers. In that case, a nickel layer having a thickness on the order of 10 nanometers or an aluminum layer having a thickness on the order of 20 nanometers may provide a suitable semi-transparent reflective layer.

If, however, the reflective layer is added to the innermost information layer of a medium, a non-transparent reflective layer may be more desirable. In that case, a nickel layer having a thickness on the order of 25 nanometers or greater or an aluminum layer having a thickness on the order of 50 nanometers can be used. As an alternative for the semi-transparent reflective layer, a dielectric layer such as "SiOxNy" which includes silicon, oxygen and nitrogen could be used.

If the information layer is a write-once or re-writable layer, a phase change material or magneto-optic material can be deposited on the information layer. For example, a phase change material may comprise a phase change stack. Two examples include "GST," which is a silver/tellurium/germanium stack, and "AIST," which a silver/indium/antimony/tellurium stack. Other phase change materials could also be used.

After material has been deposited on the information layers according to media format (38), the process of FIG. 3 can be repeated for the same medium. In this manner, two-sided dual-layer, or two-sided multiple-layer media can be created. The various layers may be defined by the material that is deposited on a given information layer. However, when more than one layer is included on the same side of a two-sided medium, additional challenges arise. One such challenge relates to the level of transparency of the reflective layers. As mentioned above, if a reflective layer is added to the outermost information layer, the reflective layer may need to be semi-transparent so that at least some light can penetrate to the inner layers.

Another challenge relates to the thicknesses of the information layers. In particular, if multiple information layers are included on the same side of a two-sided medium, the outer information layers may need to be sufficiently thick to avoid interference between the layers when light is focused on a particular layer.

Figure 4:
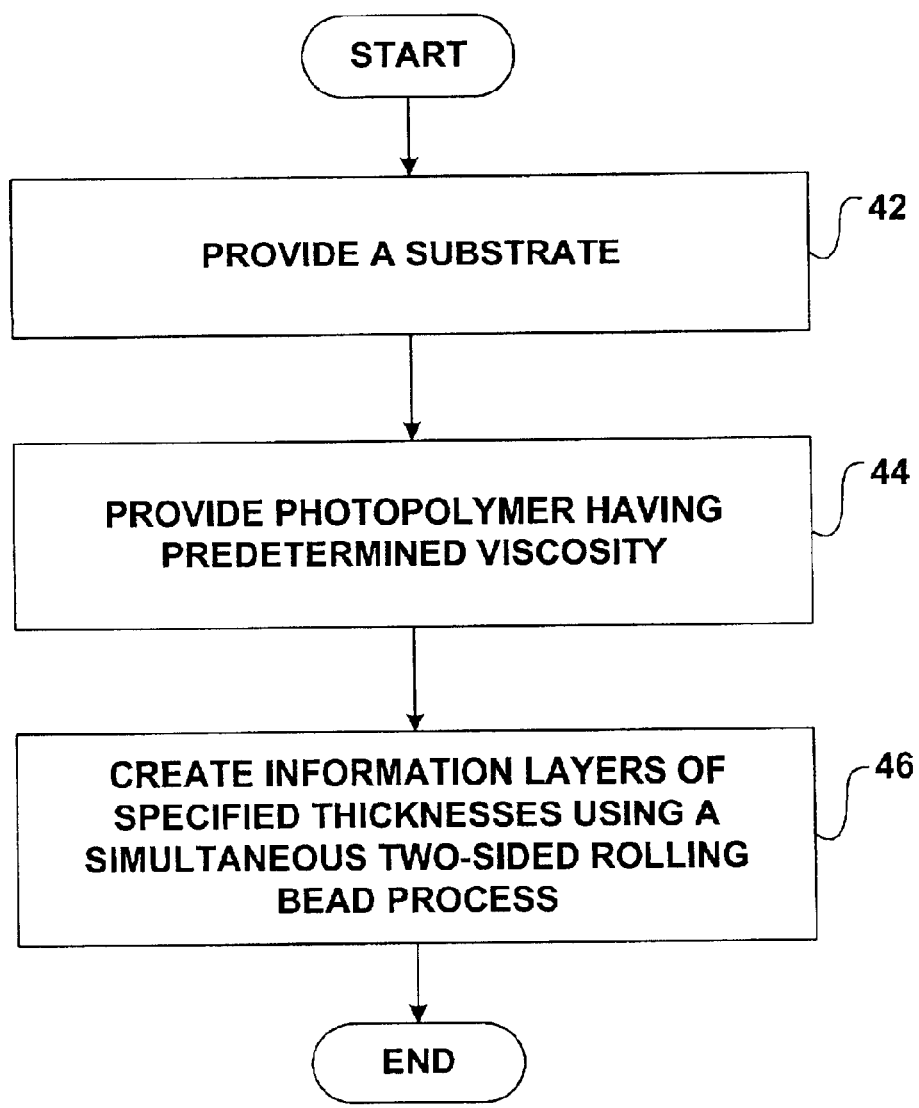
FIG. 4 is a flow diagram according to the invention illustrating a process that addresses information layer thickness concerns.

FIG. 4 is a flow diagram according to the invention illustrating a process that addresses information layer thickness concerns. As shown, a substrate is provided (42), and a photopolymer having a predetermined viscosity is also provided (44). Information layers having specified thicknesses can then be created using a simultaneous two-sided rolling bead process (46). Establishing the appropriate viscosity of the photopolymer is a relatively simple way to define the thicknesses of the information layers. More viscous photopolymer will yield information layers that are thicker. The pressure at which the roller is rolled over the stampers and the rolling speed can also affect information layer thickness. For example, greater pressure and slower rolling speeds generally yield information layers that are thinner.

The easier process to control, however, establishes a fixed rolling pressure and a fixed rolling speed for the roller, and then varies the photopolymer viscosity to control information layer thickness. By way of example, a photopolymer may include 49% hydantoin hexacrylate, 49% hexanediol diacrylate, and 2% 2-dimethoxy-2-phenylacetophenone. Alternatively, the photopolymer may include 40% hexanediol diacrylate, 29% glycol monethyl ether acrylate, 29% polyethyl methacrylate, and 2% 2-dimethoxy-2-phenylacetophenone. The 2% 2-dimethoxy-2-phenylacetophenone is generally fixed. However, other compositions can be varied to change the viscosity of the photopolymers. Importantly, higher viscosities yield thicker information layers and lower viscosities yield thinner information layers.

In a first experimental example, a photopolymer having a viscosity of approximately 500 centipoise was deposited on both sides of a medium. A roll pressure resulting from an air cylinder regulated at 90 pounds per square inch (PSI) (620 kilopascal) was applied at a roll speed of 0.25 inches per second (0.635 centimeters/second). The resultant medium had a top information layer thickness of approximately 4 microns and a bottom information layer thickness of approximately 7 microns.

In a second experimental example, a photopolymer having a viscosity of approximately 1000 centipoise was deposited on both sides of a medium. A roll pressure resulting from an air cylinder regulated at 90 pounds per square inch (PSI) (620 kilopascal) was applied at a roll speed of 0.50 inches per second (1.27 centimeters/second). The resultant medium had a top information layer thickness of approximately 13 microns and a bottom information layer thickness of approximately 16 microns.

In a third experimental example, a photopolymer having a viscosity of approximately 5000 centipoise was deposited on both sides of a medium. A roll pressure resulting from an air cylinder regulated at 80 pounds per square inch (PSI) (550 kilopascal) was applied at a roll speed of 0.50 inches per second (1.27 centimeters/second). The resultant medium had a top information layer thickness of approximately 48 microns and a bottom information layer thickness of approximately 55 microns.

If multiple layers are included on the same side of a two-sided medium, the innermost layer can generally have any thickness. The outer layers, however, may require thicknesses on the order of 50 microns or greater to avoid optical interference between the outer layer and inner layers. In one example, a two-sided dual-layer optical data storage disk includes inner layers having thicknesses on the order of 5 microns and outer layers have thicknesses on the order of 50 microns. The first experimental example above can be used to realize inner layers having thicknesses on the order of 5 microns, and the third experimental example above can be used to realize outer layers having thicknesses on the order of 50 microns.

When beads of photopolymer having the same viscosity are positioned on both sides of a substrate in a simultaneous two-sided rolling bead process, the information layer on the bottom of the substrate may be slightly thicker than that on the top of the substrate. The experimental examples above, support this conclusion. The cause of the variation relates to differences in pressure applied to the top and bottom layers. The roller applies a more localized pressure to the top layer. The substrate distributes the pressure such that the pressure applied to the bottom layer is less localized than that applied to the top layer.

The thickness variation between top and bottom layers may be on the order of approximately 3 microns, but tends to increase with increased information layer thicknesses. Variations on the order of approximately 3 microns may not pose a significant problem to media quality in most cases. However, if more accurate thickness similarities are needed for layers on the top and bottom of a substrate, or if increased information layer thickness causes larger than desired variations between the top and bottom layer thickness, the viscosity of the bead of photopolymer positioned for distribution between the bottom stamper and the substrate can be made less than that of the bead of photopolymer positioned for distribution between the top stamper and the substrate. In this manner, a bottom information layer thickness can be made to be within 3 microns of a top information layer thickness. Indeed, the thicknesses can even be made to be substantially identical.

Figure 5:
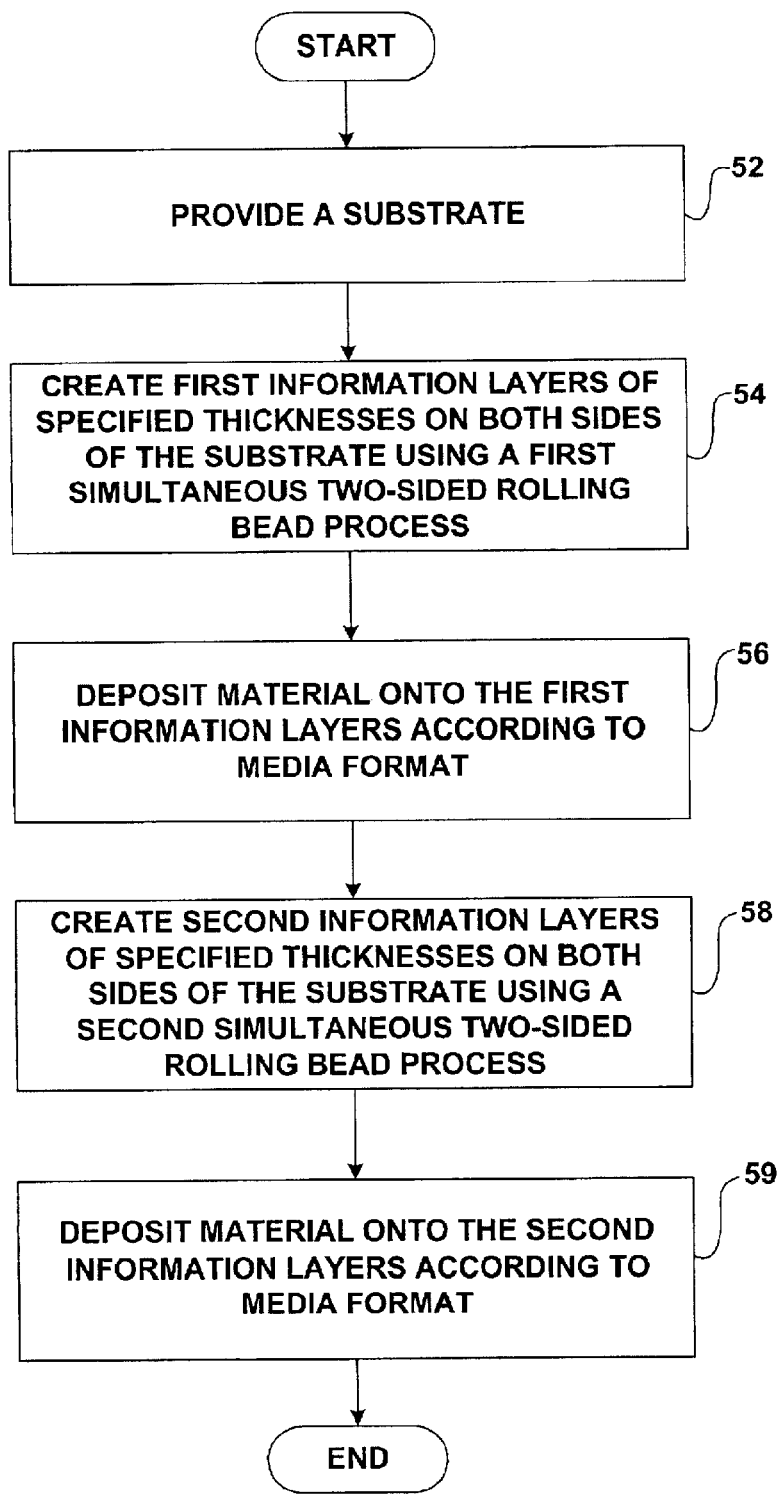
FIG. 5 is a flow diagram illustrating in more detail a process for creating a two-sided dual-layer optical data storage medium.

FIG. 5 is a flow diagram illustrating in more detail, a process for creating a two-sided dual-layer optical data storage medium. As shown, a substrate is provided (52). First information layers having a specified thicknesses are then created on both sides of the substrate using a first simultaneous two-sided rolling bead process (54). Material is then deposited onto the first information layers according to media format (56). Second information layers having a specified thicknesses are then created on both sides of the substrate using a second simultaneous two sided rolling bead process (58). Material is then deposited onto the second information layers according to media format (59). Although not illustrated in FIG. 5, additional layers, for example, third layers and fourth layers could also be created using third and fourth simultaneous two sided rolling bead processes. After the creation of each information layer, material can be deposited on the information layers according to media format.

FIG. 6 is a flow diagram illustrating a process for creating one specific format of a two-sided dual-layer optical data storage medium. As shown, a substrate is provided (62). The substrate may be a polycarbonate substrate having a thickness on the order of 500 microns. First information layers having thicknesses on the order of 5 microns are then created on both sides of the substrate using a first simultaneous two-sided rolling bead process (64). Phase change material is then deposited onto the first information layers (66). Second information layers having thicknesses on the order of 50 microns are then created on both sides of the substrate using a second simultaneous two sided rolling bead process (68). A reflective material is then deposited onto the second information layers (69). Again, the medium may be oversized during fabrication and then die punched or otherwise cut out to avoid problems associated with thickness variations at the edges of the oversized medium.

FIGS. 7–11 are cross-sectional side views of exemplary data storage media that can be created using one or more of the techniques described herein. As shown in FIG. 7, a data storage medium 70 includes a substrate 71 and information layers 72 and 73 on opposing sides of substrate 71. Deposited layers 74 and 75 reside on top of the respective information layers 72 and 72. For example, deposited layers 74 and 75 may include reflective materials, magneto-optic materials or phase change materials.

FIG. 8 illustrates a two-sided dual-layer optical data storage medium 80. Medium 80 includes a substrate 81 and first information layers 82 and 83 on opposing sides of substrate 81. First reflective layers 84 and 85 are deposited on the respective first information layers 82 and 83. Second information layers 86 and 87 reside on top of the first reflective layers 84 and 85, and second reflective layers 88 and 89 are deposited on top of the second information layers 86 and 87.

FIG. 9 illustrates another two-sided dual-layer optical data storage medium 90. Medium 90 includes a substrate 91 and first information layers 92 and 93 on opposing sides of substrate 91. Phase change layers 94 and 95 are deposited on the respective first information layers 92 and 93. Second information layers 96 and 97 reside on top of the phase change layers 94 and 95, and reflective layers 98 and 99 are deposited on top of the second information layers 96 and 97.

Figure 10:
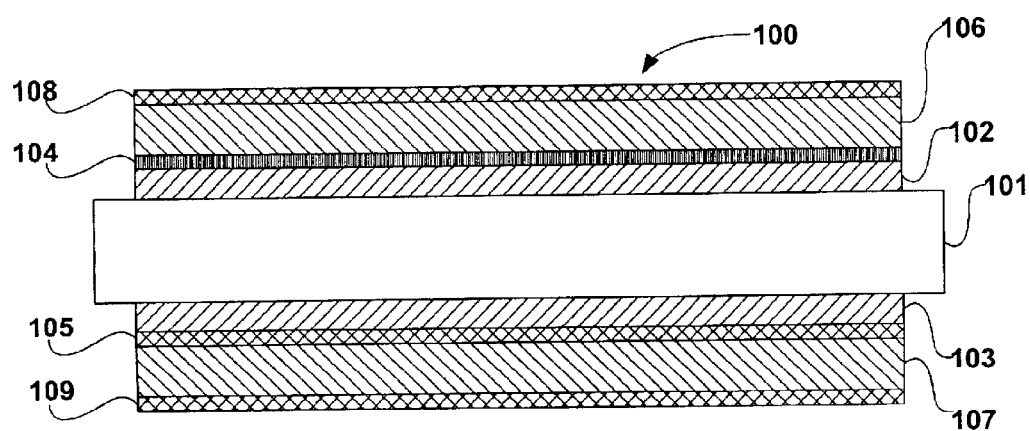

FIG. 10 illustrates yet another two-sided dual-layer optical data storage medium 100. Medium 100 includes a substrate 101 and first information layers 102 and 103 on opposing sides of substrate 101. A phase change layer 104 is deposited on first information layer 102 and a first reflective layer 105 is deposited on first information layer 103. Second information layers 106 and 107 reside on top of the phase change layer 104 and first reflective layer 105. Second reflective layers 108 and 109 are deposited on top of the second information layers 106 and 107.

Figure 11:
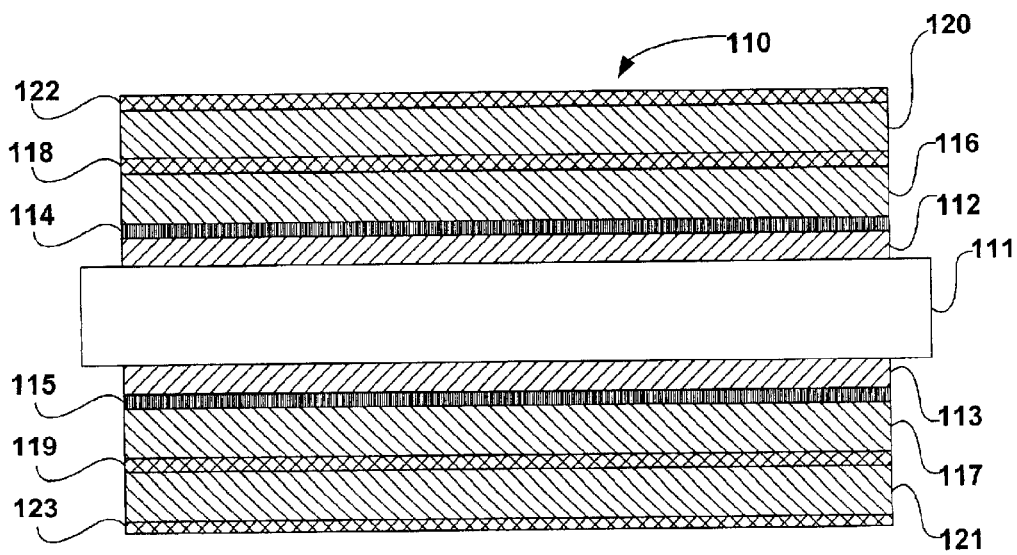

FIG. 11 illustrates a two-sided three-layer optical data storage medium 110. Medium 110 includes a substrate 111 and first information layers 112 and 113 on opposing sides of substrate 111. Phase change layers 114 and 115 are deposited on the respective first information layers 112 and 113. Second information layers 116 and 117 reside on top of the phase change layers 114 and 115, and first reflective layers 118 and 119 are deposited on top of the second information layers 116 and 117. Third information layers 120 and 121 reside on top of the second information layers 116 and 117, and second reflective layers 122 and 123 are deposited on top of the third information layers 120 and 121.

Media having still additional layers are also contemplated. In general, any time information layers are added to both sides of a medium, the simultaneous two-sided rolling bead techniques according to the invention may be used.

A disk drive generally reads data from a medium by spinning the medium and focusing light on a respective information layer. Indeed, as described above, outer information layers may need to be sufficiently thick to ensure that interference does not occur during readout. The reflection of the focused light can be detected by the disk drive and interpreted accordingly. In the cases where write-once or rewritable material is deposited on an information layer, the disk drive may write information on the medium by focusing relatively high intensity light on the write-once or rewritable material. The relatively high intensity light, for example, may change the phase of the material, causing lower intensity light to reflect differently off the material. The lower intensity reflected light can be interpreted by the disk drive as encoded data.

Various embodiments of the invention have been described. For instance, simultaneous two sided rolling bead processes have been described for the creation of data storage media. Nevertheless, various modifications may be made without departing from the scope of the invention. For example, the invention could be used to create non-disk shaped optical media, or media having any number of layers, or even non-optical data storage media or media having non-optical storage layers. For example, simultaneous two sided rolling bead process could be used to create a top outermost layer having transducer detectable surface variations as described in co-pending and commonly assigned U.S. application Ser. No. 09/730,199 to Kerfeld, Morkved and Hellen, filed Dec. 5, 2000, entitled "DATA STORAGE MEDIA," the entire content of which is incorporated herein by reference.

In addition, the techniques could be used in conjunction with more conventional techniques to realize data storage media having more information layers on one side that the other. If an information layer is added to only one side of the medium, a conventional process, such as a single sided rolling bead process could be used. Then, if additional information layers are to be added to both sides of the medium, a simultaneous two-sided rolling bead process could be used. These and other embodiments are within the scope of the following claims.

What is claimed is:

1. A method comprising:
   positioning a first bead of photopolymer for distribution between a bottom stamper and a bottom surface of a substrate;
   positioning a second bead of photopolymer for distribution between a top stamper and a top surface of the substrate; and
   passing a roller over the top stamper to distribute the first and second beads of photopolymer over the top and bottom surfaces of the substrate to form information layers on both sides of the substrate.

2. The method of claim 1, further comprising curing the photopolymer and peeling the substrate from the stampers.

3. The method of claim 2, wherein curing the photopolymer includes exposing the photopolymer to ultraviolet light transmitted through at least one of the stampers.

4. The method of claim 3, wherein curing the photopolymer includes exposing the photopolymer to ultraviolet light transmitted through both the top and bottom stampers.

5. The method of claim 1, wherein:
   positioning the first bead of photopolymer comprises positioning the first bead of photopolymer between a top stamper assembly and the substrate, and
   positioning the second bead of photopolymer comprises positioning the second bead of photopolymer between a bottom stamper assembly and the substrate.

6. The method of claim 2, further comprising deposing materials on the cured photopolymer.

7. A method comprising:
   providing a substrate; and
   creating information layers on both sides of the substrate using a simultaneous two-sided rolling bead process, wherein the simultaneous two-sided rolling bead process includes:
   positioning a first bead of photopolymer for distribution between a bottom stamper and a bottom surface of the substrate;
   positioning a second bead of photopolymer for distribution between a top stamper and a top surface of the substrate; and
   passing a roller over the top stamper to distribute the first and second beads of photopolymer over the top and bottom surfaces of the substrate.

8. The method of claim 7, further comprising depositing material on the information layers.

9. The method of claim 8, wherein depositing material comprises depositing a phase change material.

10. The method of claim 8, wherein depositing material comprises depositing a reflective material.

11. A method comprising:
   providing a substrate;
   providing a photopolymer having a predetermined viscosity; and
   creating information layers of specified thicknesses using a simultaneous two-sided rolling bead process, wherein the predetermined viscosity defines the specified thicknesses, and wherein the simultaneous two-sided rolling bead process includes:

positioning a first bead of the photopolymer for distribution between a bottom stamper and a bottom surface of the substrate;

positioning a second bead of the photopolymer for distribution between a top stamper and a top surface of the substrate; and passing a roller over the top stamper to distribute the first and second beads of the photopolymer over the top and bottom surfaces of the substrate.

12. The method of claim 11, further comprising:

controlling pressure and speed of the roller used in the simultaneous two-sided rolling bead process, wherein the predetermined viscosity and the pressure and speed of the roller used in the simultaneous two-sided rolling bead process collectively define the specified thicknesses.

13. A method comprising:

providing a substrate;

creating first information layers on both sides of the substrate using a first simultaneous two-sided rolling bead process, wherein the first simultaneous two-sided rolling bead process includes positioning a first bead of photopolymer for distribution between a bottom stamper and a bottom surface of the substrate, positioning a second bead of photopolymer for distribution between a top stamper and a top surface of the substrate, and passing a roller over the top stamper to distribute the first and second beads of photopolymer over the top and bottom surfaces of the substrate;

depositing a first material onto the first information layers;

creating second information layers on both sides of the substrate using a second simultaneous two-sided rolling bead process; and depositing a second material onto the second information layers.

14. The method of claim 13, wherein the first and second materials are the same.

15. The method of claim 13, wherein depositing the first material comprises depositing phase change materials onto the first information layers.

16. The method of claim 13, wherein depositing the second material comprises depositing a reflective material onto the second information layers.

17. The method of claim 13, wherein the second simultaneous two-sided rolling bead processes includes:

positioning another first bead of photopolymer for distribution between another bottom stamper and the substrate;

positioning another second bead of photopolymer for distribution between a top stamper and the substrate;

passing the roller over the top stamper of the second two-sided rolling bead process to distribute the beads of photopolymer of the second two-sided rolling bead process;

curing the photopolymer of the second two-sided rolling bead process; and peeling the substrate from the stampers of the second two-sided rolling bead process.

18. The method of claim 13, farther comprising:

creating third information layers on both sides of the substrate using a third simultaneous two-sided rolling bead process; and depositing a third material onto the third information layers.

19. A method comprising:

providing a substrate;

creating a first information layer having a thickness on the order of 5 microns using a first simultaneous two-sided rolling bead process, wherein the first simultaneous two-sided rolling bead process includes positioning a first bead of photopolymer for distribution between a bottom stamper and a bottom surface of the substrate, positioning a second bead of photopolymer for distribution between a top stamper and a top surface of the substrate, and passing a roller over the top stamper to distribute the first and second beads of photopolymer over the top and bottom surfaces of the substrate;

depositing a phase change material onto the first information layers;

creating a second information layer having a thickness on the order of 50 microns using a second simultaneous two-sided rolling bead process; and depositing a reflective material onto the second information layers.

20. The method of claim 19, wherein the material comprises a semi-transparent reflective layer.

21. A method comprising:

providing a substrate;

creating a first information layer having a thickness on the order of 5 microns using a first simultaneous two-sided rolling bead process, wherein the first simultaneous two-sided rolling bead process includes positioning a first bead of photopolymer for distribution between a bottom stamper and a bottom surface of the substrate, positioning a second bead of photopolymer for distribution between a top stamper and a top surface of the substrate, and passing a roller over the top stamper to distribute the first and second beads of photopolymer over the top and bottom surfaces of the substrate;

depositing a first reflective layer onto the first information layers;

creating a second information layer having a thickness on the order of 50 microns using a second simultaneous two-sided rolling bead process; and depositing a second reflective layer onto the second information layers.

22. The method of claim 21, wherein the second reflective layer is a semi-transparent reflective layer.

23. A method comprising:

positioning a first bead of a first photopolymer for distribution between a first bottom stamper and a substrate;

positioning a second bead of the first photopolymer for distribution between a first top stamper and the substrate;

passing a roller over the first top stamper to distribute the first beads of photopolymer;

curing the first photopolymer to define first information layers on the substrate;

peeling the substrate from the first stampers;

depositing phase change materials on the first information layers;

positioning a first bead of a second photopolymer for distribution between a second bottom stamper and the substrate;

positioning a second bead of the second photopolymer for distribution between a second top stamper and the substrate;

passing a roller over the second top stamper to distribute the second beads of photopolymer;

curing the second photopolymer to define second information layers on the substrate;

peeling the substrate from the second stampers; and deposing reflective layers on the second information layers.

24. The method of claim 23, further comprising:

predetermining viscosities of the first and second photopolymers to define thicknesses of the first and second information layers.

25. The method of claim 1, further comprising selecting viscosities of the first and second beads of photopolymer such that an information layer created on the bottom surface of the substrate via the first bead of photopolymer is thicker than an information layer created on the top surface of the substrate via the second bead of photopolymer.

26. The method of claim 1, further comprising selecting different viscosities of the first and second beads of photopolymer such that an information layer created on the bottom surface of the substrate via the first bead of photopolymer defines a thickness within three microns of a thickness of an information layer created on the top surface of the substrate via the second bead of photopolymer.

* * * * *